No. 862,946. PATENTED AUG. 13, 1907.
E. W. TUCKER.
SECTIONAL METALLIC PACKING.
APPLICATION FILED NOV. 22, 1906.

Witnesses
Edwin W. Tucker Jr.
M. J. Kuhl

Inventor
Edwin W. Tucker
By Baldwin Vale
Attorney

UNITED STATES PATENT OFFICE.

EDWIN W. TUCKER, OF SAN FRANCISCO, CALIFORNIA.

SECTIONAL METALLIC PACKING.

No. 862,946.  Specification of Letters Patent.  Patented Aug. 13, 1907.

Application filed November 22, 1906. Serial No. 344,636.

*To all whom it may concern:*

Be it known that I, EDWIN W. TUCKER, a citizen of the United States, and residing at 818 Page street, in the city of San Francisco, county of San Francisco, and State of California, have invented certain new and useful Improvements in Sectional Metallic Packing; and I do hereby declare the following to be a full, clear, and exact description of the said invention, such as will enable others skilled in the art to which it most nearly appertains to make, use, and practice the same.

This invention relates to improvements in sectional metallic packing.

The objects accomplished are to provide an all-metal construction capable of conforming to the inequalities of the piston rod, and the lateral disalinement of the same, and capable of positive adjustment to compensate for wear of the parts; and further to provide a construction capable of variations to meet the conditions of high, and low fluid pressures; and to so incase the packing members that they will be unaffected by the lateral pressure within the packing chamber.

Broadly the invention consists of a series of inclosing rings encircling the piston rod, and having flanges telescoping over annular diametrical reductions on the adjacent ring, and having an internal recess inclined toward the piston rod and filled with sectional packing rings. The series of inclosing rings being resiliently confined between ball shaped bearing rings oscillating on suitable seats provided in the ends of the packing chamber, the whole being capable of a fixed longitudinal adjustment; and a sliding wiper adapted to freely distribute a lubricant over the surface of the piston rod.

Figure 1:
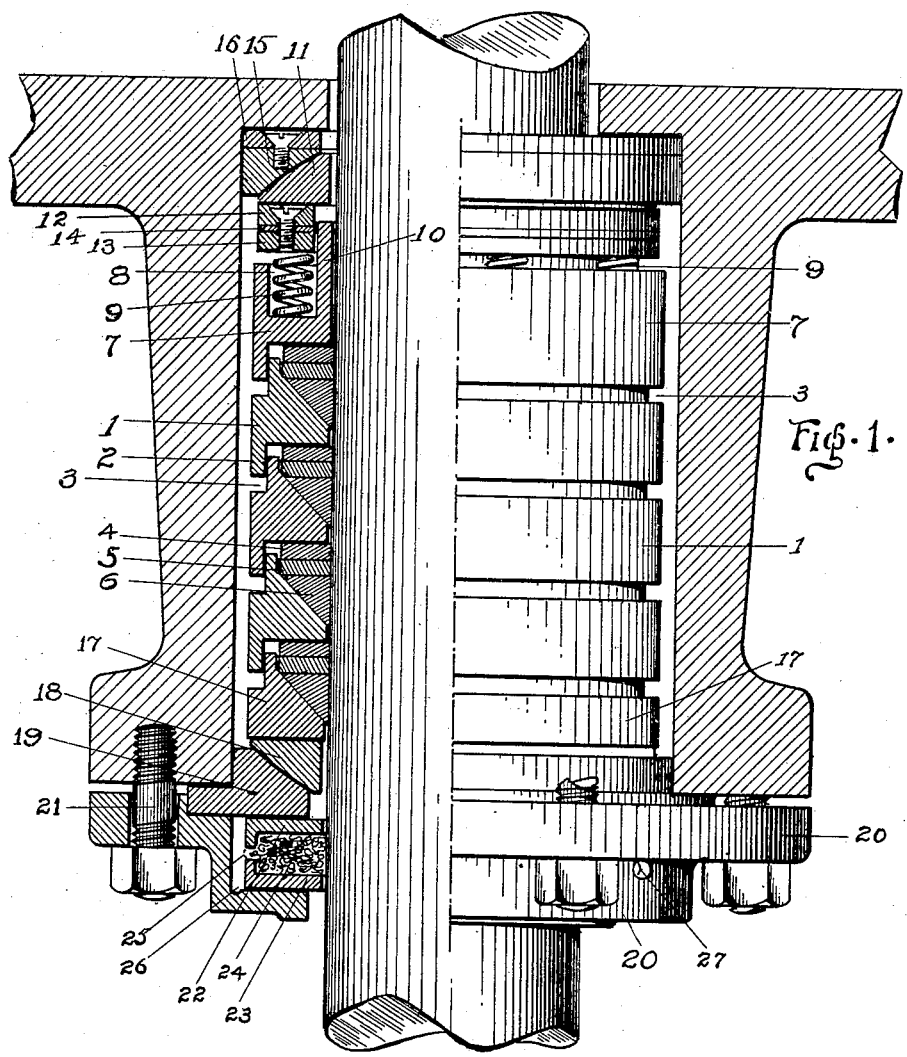
Figure 2:
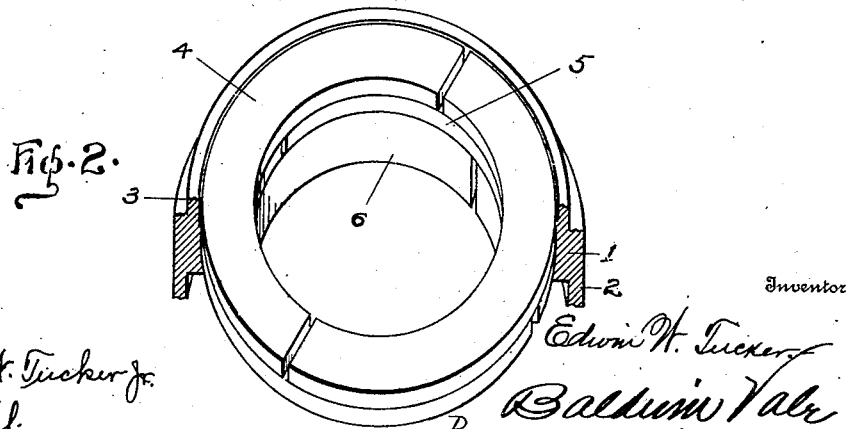

In the drawings: Figure 1 is a vertical cross section of a packing constructed in accordance with this invention; portions being shown in full lines to disclose construction. Fig. 2 is an isometrical plan view of a packing unit disclosing the assemblage of its parts.

In detail the construction consists of a series of inclosing rings #1, having the annular flange #2, overhanging the circumferential cut #3, of the adjacent rings. The internal space of the inclosing rings is inclined from the top to the bottom of the rings, forming a triangular space with its face formed by the surface of the piston rod, its side by the bottom of the adjacent ring, and its hypotenuse formed by the incline surface of the interior of the ring. This space is filled by the sectional rings #4, 5, & 6 accurately shaped and ground to fit the space, and bear pressure tight against each other and the inclosing surfaces. The rings #4, 5 & 6 are divided diametrically and arranged in "break joint" with respect to each other.

The spring seat ring #7, is provided with the recesses #8 arranged concentrically with the rod, and inclose the spiral springs #9. These springs have heretofore been a source of danger to the packing; in that they break and the particles work between the rod and the packing members, and score the surface of the rod. It is to eliminate this danger that the upwardly extending flange #10 formed on the ring #7. The bearing ring interposed between the springs and the ball ring #11 hugs the flange #10, effectually preventing the particles of a broken spring from finding its way to the piston rod. The bearing ring is made up of the annular rings #12, and #13 with the sectional shims #14 interposed, the whole being secured together by screws. These shims of varying thickness are carried in reserve and may be inserted to compensate for the wear of the packing members. The ball ring #11 oscillates in the ball seat ring #15 which is fixed in the upper end of the inclosing packing chamber. It is good practice to provide this ring with the shim #16 which permits of further compensation for wear of the packing members as before described. The base ring #17, (similar to the rings #1,) rests upon the ball ring #18, which oscillates upon the seat ring #19 fitted within the opening of the inclosing chamber and held in place by the gland cap #20, secured by the stud bolts #21, set in the neck of the cylinder.

All joints between packing members are ground pressure-tight, and capable of sliding upon each other at an angle to the line of travel of the piston rod without leakage. In this manner the packing members can spread to pass inequalities in the diameter of the piston rod, or lateral disalinements thereof without permitting escape of fluid pressure.

The oil wiper consists of the two annular plates #22, and #23, encircling the piston rod, and packed between with the fiber #24, which is held in by the flanges #25. The plates bear pressure tight against the underside of the ring #19, and the inner flange of the gland cap #20. By this construction an oil tight chamber #26, is formed about the piston rod into which lubricant can be introduced through the oil hole #27.

All members coming in contact with the piston rod are composed of a bland nonheating metal such as is known to the trade as antifriction metal. Other parts can be composed of metals best suited to their functions.

With the packing assembled as shown the operation is as follows: The steam enters the packing chamber from above and exerts its expansive pressure against all the exposed surface of the packing. The inclosing rings #1 all telescoping within each other with pressure-tight joints it is obviously impossible for the fluid pressure to have any lateral effect upon the packing members in contact with the piston rod. Therefore the effect of the fluid pressure is exerted only upon the upper end of the packing, tending to compress it, and cause the sectional packing rings to drive against the inclined plane of the inclosing rings and jam against the surface of the piston rod. At this point is illustrated the adaptability of this packing to the various fluid pressures. If the fluid pressure is high the angle of the incline is made acute; if the pressure is low, the angle is made obtuse. The wedging action is greater with the inclination at an acute angle, and this being so, it is obvious that the necessary pressure breaking effect can be calculated to meet any condition of pressure. This is especially true in view of the fact that the pressure breaking effect is exactly in proportion to the fluid pressure exerted upon the packing. No pressure is exerted upon the packing during the return stroke of the piston; hence it is necessary to provide the springs to maintain the packing members always in operative position, and prevent "stringing out" and hammering of the packing.

Other details of construction and effect being obvious to any one skilled in the art further description is deemed unnecessary.

Having thus described this invention what is claimed and desired to secure by Letters Patent is:

1. In a packing the combination with an inclosing stuffing box having concave seats at both openings a pressure breaker consisting of a series of rings telescoping within each other, and having a cone shaped space between packed with sectional packing members; one end ring having springs seated therein, and an upwardly extending flange between said springs and the piston rod; an adjustable bearing interposed between said springs and a ball shaped ring seated in the concave seat at the adjacent end of the stuffing box; and a bell shaped ring similarly seated in the opposite end of the stuffing box; and a wiper consisting of two flanged plates with an absorbent between and hermetically inclosed about the piston rod.

2. In a packing the combination with an inclosing stuffing box; having concave seats at both openings; a pressure breaker consisting of a series of rings telescoping within each other and having a cone shaped space between packed with sectional packing members; and resilient members interposed between the pressure breaker and the ball shaped rings engaging the said concave seat, in the stuffing box.

3. In a packing the combination with an inclosing stuffing box having concave seats at both openings; a pressure breaker consisting of a series of rings telescoping within each other and packed between with sectional packing members; and resilient members interposed between the pressure breaker and ball shaped rings engaging the said concave seats in the stuffing box.

4. In a packing the combination with an inclosing stuffing box of a pressure breaker provided with an end ring having springs seated therein, said ring having a flange interposed between the springs and the piston rod, said flange being of greater length than said springs.

5. In a packing the combination with an inclosing stuffing box of a pressure breaker provided with an end ring having springs seated therein, and a bearing ring interposed between said springs and the end of the stuffing box, said bearing ring being formed of a plurality of members having a shim removably secured between them, whereby shims of different sizes may be introduced to take up wear.

6. In a packing the combination with an inclosing stuffing box with packing members therein; a gland cap holding said packing members within said stuffing box; a wiper composed of two annular flanged plates encircling the piston rod, and packed between with an absorbent, and having hermetical sliding contact with the gland cap and the end of the packing member.

In testimony whereof, I have hereunto set my hand this sixth day of November 1906.

EDWIN W. TUCKER.

Witnesses:
 BALDWIN VALE,
 A. J. HENRY.